United States Patent
Bowe et al.

(10) Patent No.: US 8,021,633 B2
(45) Date of Patent: Sep. 20, 2011

(54) PROCESS AN APPARATUS FOR STEAM-METHANE REFORMING

(75) Inventors: Michael Joseph Bowe, Preston (GB);
Clive Derek Lee-Tuffnell, Poole (GB);
Jason Andrew Maude, Cheadle (GB);
John William Stairmand, Chester (GB); Ian Frederick Zimmerman, Wimborne (GB)

(73) Assignee: CompactGTL plc, Abingdon, Oxfordshire (GB)

( * ) Notice: Subject to any disclaimer, the term of this patent is extended or adjusted under 35 U.S.C. 154(b) by 526 days.

(21) Appl. No.: 12/081,303

(22) Filed: Apr. 14, 2008

(65) Prior Publication Data
US 2008/0194712 A1    Aug. 14, 2008

Related U.S. Application Data

(63) Continuation of application No. 10/497,785, filed on Jun. 29, 2004, now abandoned.

(30) Foreign Application Priority Data

Dec. 5, 2001 (GB) .................................. 0129054.3
Feb. 28, 2002 (GB) .................................. 0204677.9

(51) Int. Cl.
*B01J 21/20* (2006.01)
(52) U.S. Cl. ........ 422/629; 422/625; 422/601; 422/603; 518/700; 48/127.7
(58) Field of Classification Search .................. None
See application file for complete search history.

(56) References Cited

U.S. PATENT DOCUMENTS 1,662,870 A    3/1928 Stancliffe
(Continued)

FOREIGN PATENT DOCUMENTS

DE    3926466    2/1991
(Continued)

OTHER PUBLICATIONS

Foreign Search Report for Application No. GB 0204677.9 dated Oct. 22, 2002.
(Continued)

*Primary Examiner* — Nina Bhat
(74) *Attorney, Agent, or Firm* — McDermott Will & Emery LLP

(57) ABSTRACT

Methane is reacted with steam, to generate carbon monoxide and hydrogen in a first catalytic reactor (14); the resulting gas mixture can then be used to perform Fisher-Tropsch synthesis in a second catalytic reactor (26). In performing the steam/methane reforming, the gas mixture is passed through a narrow channel in which the mean temperature and exit temperature are both in the range 750° C. to 900° C. the residence time being less than 0.5 second, and the channel containing a catalyst, so that only those reactions that have comparatively rapid kinetics will occur. The heat is provided by combustion of methane in adjacent channels (17). The ratio of steam to methane should preferably be 1.4 to 1.6, for example about 1.5. Almost all the methane will undergo the reforming reaction, almost entirely forming carbon monoxide. After performing Fischer-Tropsch synthesis, the remaining hydrogen is preferably fed back (34) to the combustion channels (17). The steam for the reforming step is preferably generated from water generated by the chemical reactions, by condensing (30, 32) the products from the Fischer-Tropsch synthesis and by condensing (19) water vapour generated in the combustion.

14 Claims, 2 Drawing Sheets

U.S. PATENT DOCUMENTS

| | | | |
|---|---|---|---|
| 4,214,867 | A | 7/1980 | Hunter |
| 5,534,328 | A | 7/1996 | Ashmead |
| 5,670,269 | A | 9/1997 | Hamada et al. |
| 5,786,393 | A | 7/1998 | Chaumette |
| 5,811,062 | A | 9/1998 | Wegeng |
| 5,900,031 | A | 5/1999 | Bloomfield |
| 5,993,984 | A | 11/1999 | Matsumura et al. |
| 6,180,846 | B1 | 1/2001 | Dandekar et al. |
| 6,200,536 | B1 | 3/2001 | Tonkovich |
| 6,211,255 | B1 | 4/2001 | Schanke et al. |
| 6,228,341 | B1 | 5/2001 | Hebert et al. |
| 6,284,217 | B1 | 9/2001 | Wang |
| 6,380,268 | B1 * | 4/2002 | Yakobson et al. ............ 518/700 |
| 6,440,895 | B1 | 8/2002 | Tonkovich |
| 6,451,864 | B1 | 9/2002 | Wang |
| 6,488,838 | B1 * | 12/2002 | Tonkovich et al. ........... 208/108 |
| 6,767,376 | B1 * | 7/2004 | Perna et al. ..................... 48/215 |
| 6,984,363 | B2 | 1/2006 | Tonkovich et al. |
| 7,087,651 | B2 | 8/2006 | Lee-Tuffnell et al. |
| 7,135,048 | B1 * | 11/2006 | Edlund et al. ................ 48/127.1 |
| 7,300,635 | B2 * | 11/2007 | Bowe et al. ................... 422/190 |
| 7,695,694 | B2 * | 4/2010 | Bowe et al. ................... 422/190 |
| 2002/0071797 | A1 | 6/2002 | Loffler et al. |
| 2005/0171217 | A1 | 8/2005 | Bowe et al. |

FOREIGN PATENT DOCUMENTS

| | | |
|---|---|---|
| DE | 19654361 | 6/1998 |
| EP | 0212878 | 3/1987 |
| EP | 0308976 | 9/1988 |
| EP | 0292245 | 11/1988 |
| EP | 0416710 | 3/1991 |
| EP | 0430184 | 6/1991 |
| EP | 0466984 | 1/1992 |
| EP | 0691701 | 10/1996 |
| EP | 0953543 | 11/1999 |
| EP | 1033769 | 9/2000 |
| WO | WO 98/38147 | 9/1998 |
| WO | WO 01/10773 | 2/2001 |
| WO | WO 01/12312 | 2/2001 |
| WO | WO 01/12323 | 2/2001 |
| WO | WO 01/12753 | 2/2001 |
| WO | WO 01/51194 | 7/2001 |
| WO | WO 0151194 * | 7/2001 |
| WO | WO 02/064248 | 8/2002 |
| WO | WO 02/066371 | 8/2002 |

OTHER PUBLICATIONS

Malaysian Office Action for Application No. PI 20024531 dated May 31, 2006.
Notice of Acceptance of Application No. PI 20024531 dated Apr. 5, 2007.
Foreign Search Report for Application No. PCT/GB02/05424 dated Feb. 26, 2003.
Singapore Examination Report for Application No. 20030453-2 dated Mar. 29, 2004.
Translation of Taiwan Office Action for Application No. 91135176 dated Jan. 29, 2004.
Translation of Taiwan Office Action for Application No. 91135176 dated May 11, 2004.
Examination Report for Application No. GB0412152.1 dated Nov. 25, 2004.
Notification of Grant for Application No. GB0412152.1 dated Feb. 15, 2005.
WPI Abstract Accession No. 1983-43825K [18] of SU 939380.
WPI Abstract Accession No. 1978-71297A [40] of JP 53098303.
Notice of Abandonment from U.S. Appl. No. 10/497,785 dated May 14, 2008.
Notice of Allowance from U.S. Appl. No. 10/497,785 dated Jan. 14, 2008.
Office Action from U.S. Appl. No. 10/497,785 dated May 2, 2007.
Antia et al., Low Cost 10 MMCF/D Gas to Syncrude Plant for Associated Gas; 30th Annual Offshore Technology Conference; 1998 Proceedings; vol. 4, pp. 753-759, Field Drilling and Development Systems, OTC 8901.

* cited by examiner

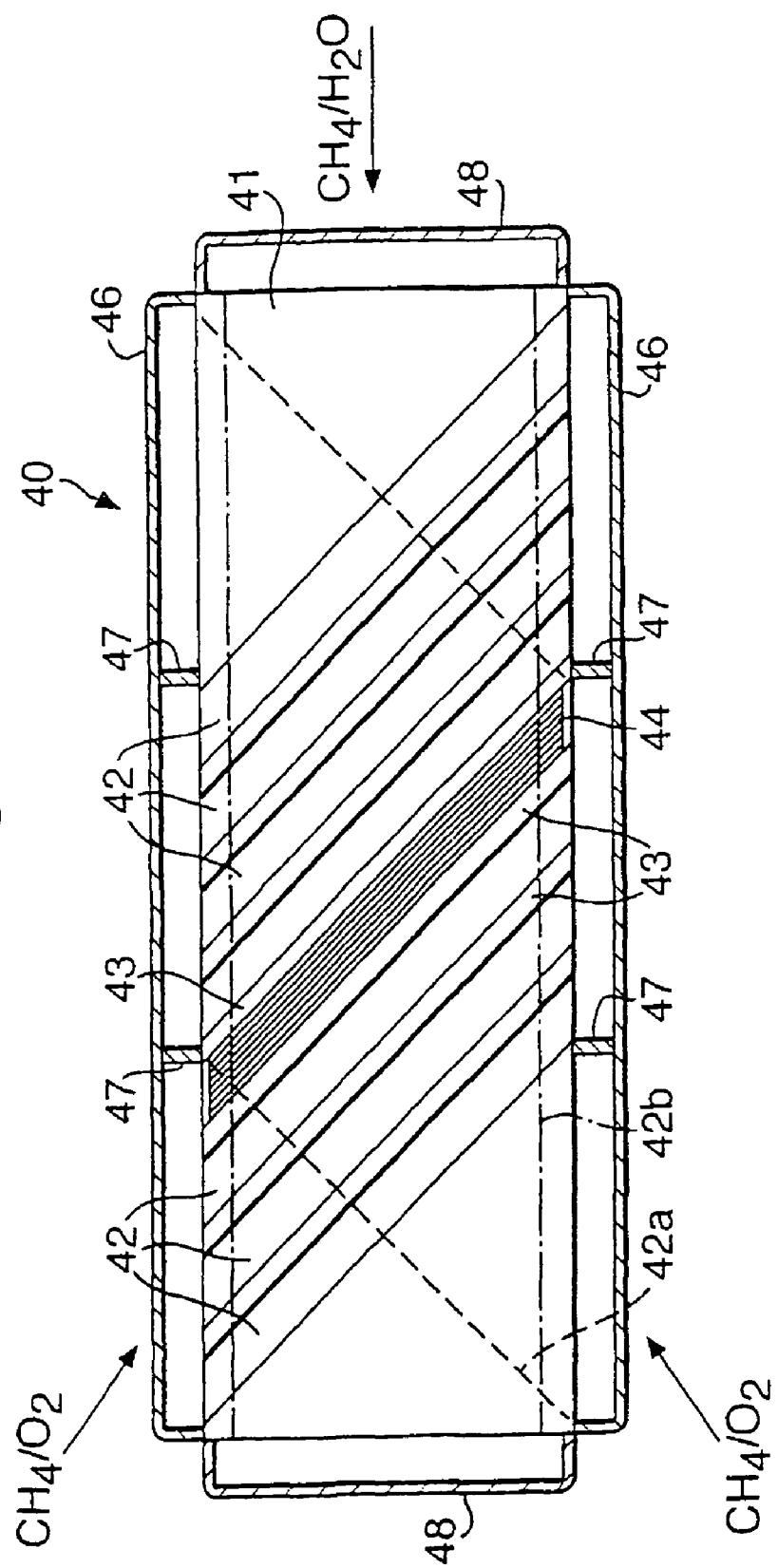

PROCESS AN APPARATUS FOR STEAM-METHANE REFORMING

This is a continuation of prior application Ser. No. 10/497,785, filed on Jun. 29, 2004 now abandoned.

This invention relates to a chemical process, and to plant including catalytic reactors suitable for use in performing the process.

A process is described in WO 01/51194 (Accentus plc) in which methane is reacted with steam, to generate carbon monoxide and hydrogen in a first catalytic reactor; the resulting gas mixture is then used to perform Fisher-Tropsch synthesis in a second catalytic reactor. The overall result is to convert methane to hydrocarbons of higher molecular weight, which are usually liquid under ambient conditions. The two stages of the process, steam/methane reforming and Fisher-Tropsch synthesis, require different catalysts, and catalytic reactors are described for each stage. The catalytic reactors enable heat to be transferred to or from the reacting gases, respectively, as the reactions are respectively endothermic and exothermic; the heat required for steam/methane reforming is provided by combustion of methane. A potential problem with this process is that other reactions may occur in the steam/methane reformer reactor, either to generate carbon dioxide, or to generate coke. It is suggested that the reformer may incorporate a platinum/rhodium catalyst, the reaction being performed at 800° C. The suggested process relies on a steam/methane ratio that is close to 1:1, as the rhodium catalyst is apparently resistant to coking. An improved way of performing this process has now been found.

According to the present invention there is provided a process for performing steam/methane reforming to generate carbon monoxide and hydrogen, wherein the gas mixture is caused to flow through a narrow flow channel between metal sheets separating the flow channel from a source of heat, the flow channel containing a fluid-permeable catalyst structure, the residence time in the channel being less than 0.5 second, and both the average temperature along the channel and the exit temperature of the channel being in the range 750° C. to 900° C., wherein the steam is supplied at least in part by condensing water vapour from combustion of a combustible gas, preferably comprising methane.

The present invention also provides a plant for performing steam/methane reforming that is particularly adapted for use on an oil rig, a floating platform or a ship. Under such circumstances space is limited, and the weight of the equipment must be minimized.

Preferably the residence time is less than 0.1 s, but preferably at least 0.02 s. It is presumed that such short reaction times enable the process to operate under non-equilibrium conditions, so that only those reactions that have comparatively rapid kinetics will occur. It is also preferable that the ratio of steam to methane should be in the range 1.2 to 2.0, more preferably 1.3 to 1.6, more preferably about 1.4 or 1.5. Under these conditions the proportion of methane that undergoes reaction can exceed 90%. Furthermore the selectivity in formation of carbon monoxide rather than carbon dioxide can exceed 85% and even 90%.

The catalytic reactor preferably comprises a plurality of metal sheets arranged to define first and second flow channels, the channels being arranged alternately to ensure good thermal contact between the fluids in them. Appropriate catalysts should be provided in each channel, depending on the required reaction. To ensure the required good thermal contact, both the first and the second flow channels are preferably less than 5 mm deep in the direction normal to the sheets. More preferably both the first and the second flow channels are less than 3 mm deep. Corrugated or dimpled foils, metal meshes, or corrugated or pleated metal felt sheets may be used as the substrate of the catalyst structure within the flow channels to enhance heat transfer. Since good heat transfer is needed for achieving high CO selectivity in the steam/methane reforming, a preferred structure comprises a metal foil with a thin coating comprising the catalyst material.

As described in WO 01/51194, such a reactor may be used for performing methane/steam reforming, the alternate channels containing a methane/air mixture so that the exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, or more preferably platinum/palladium on gamma alumina with a metal loading of about 10% by weight (relative to the alumina). This catalyst composition is preferably in a coating of thickness 20 to 200 μm on a surface in the channel, preferably on the foil. For the reforming reaction also several different catalysts may be used, for example nickel, platinum, palladium, ruthenium or rhodium, which may be used on ceramic coatings; the preferred catalyst for the reforming reaction is platinum with rhodium as a promoter, on alumina or stabilised alumina. Again the catalyst metal is preferably about 10% by weight compared to the alumina, and is provided as a 10-200 μm coating, preferably 10 to 50 μm. The oxidation reaction may be carried out at substantially atmospheric pressure, while although the reforming reaction may be carried out at elevated pressure, for example up to 2 MPa (20 atmospheres), operation at atmospheric pressure is preferred, or possibly slightly elevated pressure for example in the range 0 to 200 kPa above atmospheric pressure.

It will be appreciated that the materials of which the reactor are made are subjected to a severely corrosive atmosphere in use, for example the temperature may be as high as 900° C., although more typically around 800° C. or 850° C. The reactor may be made of a metal such as an aluminium-bearing ferritic steel, in particular of the type known as Fecralloy (trade mark) which is iron with up to 20% chromium, 0.5-12% aluminium, and 0.1-3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the oxide coating, so ensuring the catalytic material adheres to the metal substrate.

For some purposes the catalyst metal might instead be deposited directly onto the adherent oxide coating of the metal (without any ceramic layer).

The gases produced by the steam/methane reforming process described above are preferably then subjected to Fischer-Tropsch synthesis. This may be performed using a second such reactor, with a different catalyst. Where excess hydrogen remains, after the Fisher-Tropsch synthesis, this hydrogen is preferably separated from the desired products, and fed back to the combustion flow channels of the steam/methane reforming reactor. Combustion of a mixture of methane and hydrogen with air in these channels has been found to give more uniform temperature, and also enables the combustion reaction to be initiated more readily when the reactor is cold.

The invention will now be further and more particularly described, by way of example only, and with reference to the accompanying drawings in which:

FIG. 2 shows a plan view of a reactor suitable for performing a step of the process shown in FIG. 1.

Figure 1:
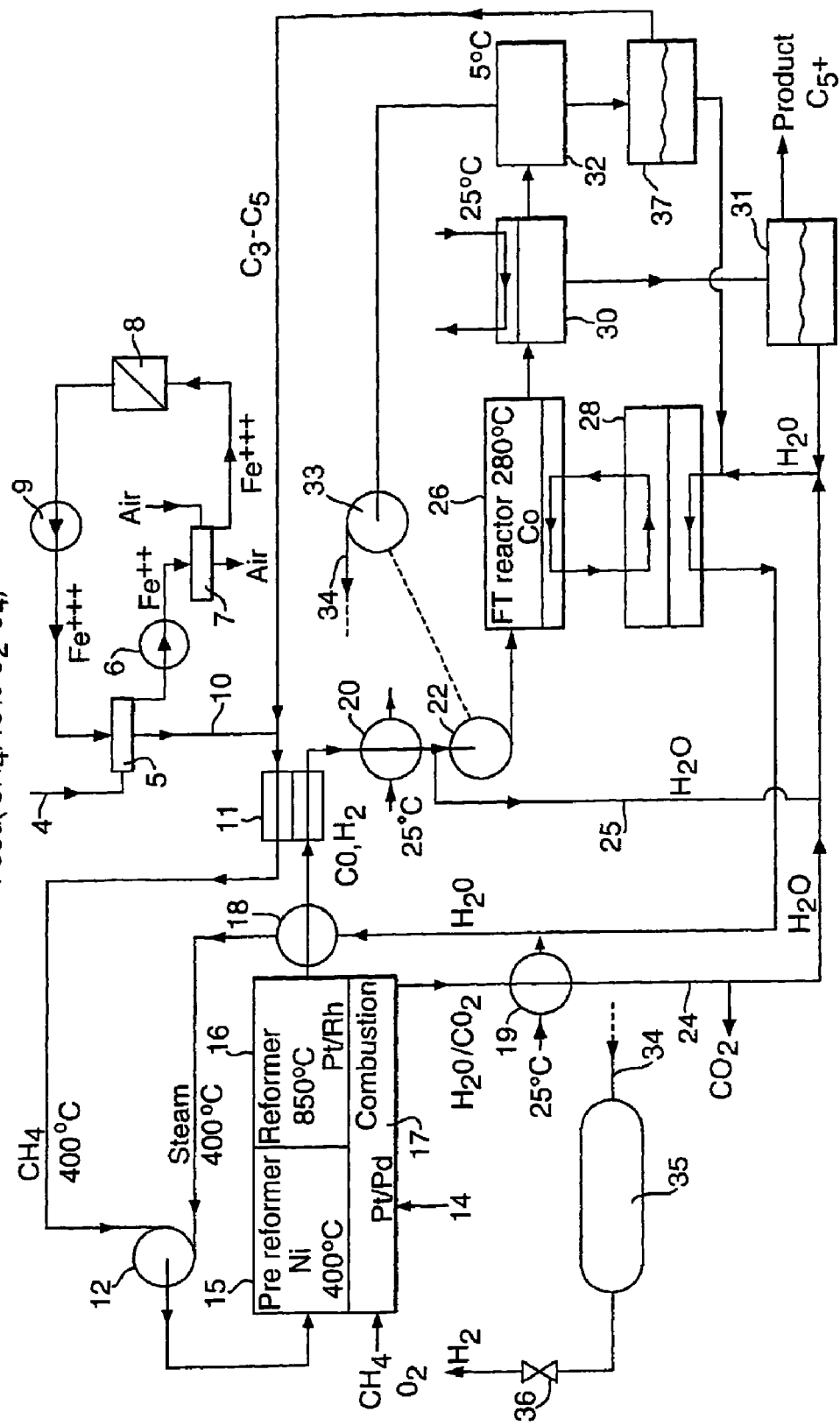
FIG. 1 shows a flow diagram of a chemical process of the invention.

The invention relates to a chemical process for converting methane to longer chain hydrocarbons. The first stage involves steam/methane reforming, that is to say the reaction:

$$H_2O + CH_4 \rightarrow CO + 3H_2$$

This reaction is endothermic, and may be catalysed by a platinum/rhodium catalyst in a first gas flow channel. The heat required to cause this reaction may be provided by combustion of methane, that is to say:

$$CH_4 + 2O_2 \rightarrow CO_2 + 2H_2O$$

which is an exothermic reaction, and may be catalysed by a platinum/palladium catalyst in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming can then be used to perform a Fischer-Tropsch synthesis to generate a longer chain hydrocarbon, that is to say:

$$nCO + 2nH_2 \rightarrow (CH_2)_n + nH_2O$$

which is an exothermic reaction, occurring at an elevated temperature, typically between 200 and 350° C., for example 230° C., and an elevated pressure typically between 2 MPa and 4 MPa, for example 2.5 MPa, in the presence of a catalyst such as iron, cobalt or fused magnetite, with a promotor such as potassium. The exact nature of the organic compounds formed by the reaction depends on the temperature, the pressure, and the catalyst, as well as the ratio of carbon monoxide to hydrogen. A preferred catalyst is γ-alumina (as a coating) of surface area 140-230 m²/g, with about 35% by weight of cobalt with a ruthenium, platinum, gadolinium or rhenium promotor and a basicity promoter such as $ThO_2$. The heat given out by this synthesis reaction may be used to provide at least part of the heat required by the steam/methane reforming reaction, for example a heat transfer fluid may be used to transfer the heat from a reactor in which the Fischer-Tropsch synthesis is occurring, also ensuring the temperature in the Fischer-Tropsch reactor remains steady, the heat being used to preheat at least one of the gas streams supplied to the reforming reactor.

These reactions would be particularly advantageous if they could be performed at sea, for example on a floating production platform or an oil rig, as they would enable stranded gas resources to be exploited. Stranded gas or associated gas reserves represent an untapped source of fuel, but cannot readily be exploited because they are often located remotely, and the gas flows may not be large enough to justify construction of a pipeline or a plant to produce liquefied natural gas. Currently such gas is usually flared or re-injected. Plant for producing liquid hydrocarbon by steam/methane reforming followed by Fischer-Tropsch synthesis on land is known, but conventional plant for this purpose is much too large to conveniently be accommodated on the deck of a floating structure, and indeed some of the processes employed would be vulnerable to wave-induced motion. However, by performing such reactions using compact catalytic reactors, for example as described in PCT/GB2002/004144, which are typically one-tenth the volume of a conventional reactor for the same duty, it is feasible to perform this process on a rig or a floating structure.

It will be appreciated from the equations given above that steam must be provided to perform the steam/methane reforming reaction, and indeed to ensure that the catalysts do not become coated with coke it is, necessary to provide more moles of steam than of methane. Ideally all the water provided to perform steam/methane reforming could be recovered after the Fischer-Tropsch synthesis, but in practice additional water is required because of inefficiencies in each stage. For operation on a rig or a floating structure at sea, it will be appreciated that such water could in principle be provided by a distillation plant fed with sea water, but boiling sea water generates salt, and tends to lead to corrosion problems; it would be preferable if the steam could be provided by the chemical process plant itself.

Referring now to FIG. 1, the plant and overall chemical process is shown as a flow diagram. The feed gas 4 consists primarily of methane, with a small percentage (say 10%) of ethane and propane. It may also contain compounds of sulphur that would be detrimental to catalysts. It is first passed through a fluidic vortex scrubber 5 in which it flows radially inward in counter-current to droplets of a de-sulphurisation liquid. This may for example comprise an aqueous solution of a chelated ferric salt that reacts with sulphurous compounds and is thereby reduced to the ferrous form. The liquid is recirculated by a pump 6 through a fluidic vortex scrubber 7 in which it is contacted by air to regenerate the ferric salt and to form a precipitate of sulphur, and then through a filter 8 and a pump 9 back to the scrubber 5. The feed gas 4 is hence de-sulphurised. The vortex scrubbers 5 and 7 are not vulnerable to wave-induced motion.

Alternatively the sulphur-contaminated natural gas may be reacted with hydrogen, at a temperature of 200-500° C. over a hydro-desulphurisation catalyst, to convert mercaptans to $H_2S$. The gas can then be passed through a bed of an adsorbent (such as ZnO so the $H_2S$ reacts to give $H_2O$ and ZnS). Some adsorbents can be regenerated in situ, producing $SO_2$.

The de-sulphurised feed gas 10 is passed through a heat exchanger 11 so it is at about 400° C. and is then supplied via a fluidic vortex mixer 12 to a first catalytic reactor 14; in the mixer 12 the feed gas is mixed with a stream of steam that is also at about 400° C., the streams entering the mixer 12 through tangential inlets and following a spiral path to an axial outlet so they become thoroughly mixed. Both streams may be at atmospheric pressure, or for example at a pressure of say 100 kPa above atmospheric. The flows are preferably such that the steam; methane molar ratio (at the steam/methane reforming stage) is between 1.4 and 1.6, preferably 1.5. The first part of the reactor 14 is a pre-reformer 15 with a nickel methanation catalyst at 400° C., in which the higher alkanes react with the steam to form methane (and carbon monoxide); extra steam is required to ensure the desired steam/methane ratio is achieved after this pre-forming stage (this pre-reformer 15 would not be required if the feed gas 4 contained substantially no higher alkanes). An alternative catalyst for the pre-reformer is platinum/rhodium. The second part of the reactor 14 is a reformer 16 with a platinum/rhodium catalyst, in which the methane and steam react to form carbon monoxide and hydrogen. This reaction may be performed at around 850° C., as described below.

The heat for the endothermic reactions may be provided by combustion of methane over a palladium or platinum catalyst within adjacent gas flow channels 17 of the reactor 14. The catalyst may incorporate a metal hexaaluminate (such as magnesium hexaaluminate) or more preferably γ-alumina, with 5-20% (say 10%) by weight palladium/platinum catalyst. The methane/oxygen mixture may be supplied to the channels 17 in stages along their length, to ensure combustion occurs throughout their length. The exhaust gases from the combustion channels 17 are passed through a sea water-cooled heat exchanger 19 to cause at least part of the water vapour to condense, the remaining gases being released to the atmosphere as exhaust while the liquid water is fed through the duct 24 (see below).

The hot mixture of carbon monoxide and hydrogen emerging from the reformer 16 is then quenched by passing through a heat exchanger 18 to provide the hot steam supplied to the vortex mixer 12, and then through the heat exchanger 11 in which it loses heat to the feed gas. The mixture is then further cooled to about 100° C. by passing through a heat exchanger 20 cooled by water. Any water vapour that condenses is separated from the gas stream into duct 25. The gases are then compressed through a compressor 22 to a pressure in the range 1.0 MPa to 2.5 MPa (10 to 25 atm.).

The stream of high pressure carbon monoxide and hydrogen is then supplied to a catalytic reactor 26 in which the gases react, undergoing Fischer-Tropsch synthesis to form a paraffin or similar compound. This reaction is exothermic, preferably taking place at about 230° C., and the heat generated may be used to preheat the steam supplied to the heat exchanger 18, using a heat exchange fluid such as helium circulated between heat exchange channels in the reactor 26 and a steam generator 28. During this synthesis the volume of the gases decreases. The resulting gases are then passed into a condenser 30 in which they exchange heat with water initially at 25° C. The higher alkanes (say C5 and above) condense as a liquid, as does the water, this mixture of liquids being passed to a gravity separator 31; the separated higher alkanes can then be removed as the desired product.

The water from the separator 31 is returned via the heat exchangers 28 and 18 to the mixer 12. The water from the ducts 24 and 25 is also combined with this water stream. The water in the separator 31 may also contain alcohols (which may be formed in the Fischer-Tropsch reactor 26), so the water may first be steam-stripped to remove such soluble organic compounds before it is returned to the mixer 12. If water that contains alcohols is returned to the mixer 12, the alcohols will be reformed to produce CO, $CO_2$ and $H_2$.

Any lower alkanes or methane, and remaining hydrogen, pass through the condenser 30 and are supplied to a refrigerated condenser 32 in which they are cooled to about 5° C. The gases that remain, consisting primarily of hydrogen with carbon dioxide, methane and ethane, are passed through a pressure-reducing turbine 33 and fed via a duct 34 into a storage vessel 35, and hence through a valve 36 into the combustion channel of the first catalytic reactor 14. The condensed vapours, consisting primarily of propane, butane and water, are passed to a gravity separator 37, from which the water is combined with the recycled water from the separator 31, while the alkanes are recycled to the feed line 10 so as to be fed into the pre-reformer 15. As indicated by the broken line, electricity generated by the turbine 33 may be used to help drive the compressor 22.

When used in this fashion the overall result of the processes is that methane is converted to higher molecular weight hydrocarbons which are typically liquids at ambient temperatures. The processes may be used at an oil or gas well to convert methane gas into a liquid hydrocarbon which is easier to transport.

From the steam/methane reforming reaction given above one would expect that the appropriate ratio between steam and methane would be 1 to 1. However, at that ratio there is a significant risk of coking, and a risk that a significant proportion of the methane will not undergo the reaction. Increasing the proportion of steam increases the proportion of methane that reacts, and decreases the risk of coking, although if the proportion of steam is too high then there is an increased likelihood of carbon dioxide formation. It has been found that operating with a steam/methane ratio of between 1.3 and 1.6, preferably 1.4 or 1.5, combined with short residence times that are preferably no more than 100 ms, gives both high selectivity for carbon monoxide formation and also a very high proportion of methane undergoing reaction. The flow rates through the reformer 16 are preferably such that the residence time is in the range 20 to 100 ms, more preferably about 50 ms. The average temperature along each channel in the reformer 16 is above 750° C., preferably between 800° C. and 900° C.

Such a short residence time enables the reactor 16 to operate under what appears to be a non-equilibrium condition. The competing reaction between carbon monoxide and steam to form the unwanted products carbon dioxide and hydrogen has slower kinetics than the steam/methane reforming reaction to form carbon monoxide and hydrogen; and in the reforming reaction the reverse process has slower kinetics than the forward reaction. The short residence time allows insufficient time for the slower reactions to reach equilibrium. Under these circumstances the proportion of methane undergoing reaction may exceed 90%, and the selectivity for carbon monoxide can exceed 90%.

Experimental measurements have been made, passing a preheated steam/methane mixture (ratio 1.5) through a multichannel reactor similar to that described below with reference to FIG. 2, with a residence time of 50 ms. The temperature was measured near the inlet and near the exit from a channel, and at other intermediate positions to enable a mean value to be calculated. Results have been obtained as in the Table:

| Inlet temp./° C. | Exit temp./° C. | Mean temp./° C. | CO selectivity/% | $CH_4$ conversion/% |
|---|---|---|---|---|
| 726 | 853 | 810 | 92.5 | 93.8 |
| 731 | 866 | 815 | 93.0 | 94.2 |

Selectivity for CO production is enhanced by operating with an exit temperature above 800° C., more preferably above 850° C. The performance of the reactor can also be improved by a pre-treatment, heating the reactor to about 850° C. in the presence of hydrogen, as this improves subsequent catalyst activity.

As indicated above, the ideal hydrogen to carbon monoxide stoichiometric ratio to feed to the Fischer-Tropsch synthesis reactor would be about 2 moles hydrogen to 1 mole carbon monoxide. This ratio cannot readily be obtained by steam/methane reforming: as discussed above, at a steam/methane ratio of 1.0 the resulting gas mixture has a hydrogen to carbon monoxide ratio 3 to 1, and at the elevated steam/methane ratios that must be adopted to avoid coking the hydrogen to carbon monoxide ratio is above 3, and may be as high as 4 to 1. Consequently, after the Fischer-Tropsch synthesis reaction has occurred there will be an excess of hydrogen that remains. Feeding this gas into the combustion channel of the reactor 14 has been found to give a more uniform temperature distribution, and also enables the combustion reaction to be initiated more readily when the reactor is cold (as catalytic combustion can then occur at a temperature as low as 15 or 20° C.). The overall thermal efficiency of the process is improved, the amount of methane fed directly to the combustion channels is decreased, and the emission of carbon dioxide to the environment is also reduced.

Referring now to FIG. 2, a reactor 40 (suitable for example for steam/methane reforming as reactor 14) comprises a stack of Fecralloy steel plates 41, each plate being generally rectangular, 450 mm long and 150 mm wide and 3 mm thick, these dimensions being given only by way of example. On the upper surface of each such plate 41 are rectangular grooves 42 of depth 2 mm separated by lands 43 (eight such grooves being shown), but there are three different arrangements of the grooves 42. In the plate 41 shown in the drawing the grooves 42 extend diagonally at an angle of 45° to the longitudinal axis of the plate 41, from top left to bottom right as shown. In a second type of plate 41 the grooves 42a (as indicated by broken lines) follow a mirror image pattern, extending diagonally at 45° from bottom left to top right as shown. In a third type of plate 41 the grooves 42b (as indicated by chain dotted lines) extend parallel to the longitudinal axis.

The plates 41 are assembled in a stack, with each of the third type of plate 41 (with the longitudinal grooves 42b) being between a plate with diagonal grooves 42 and a plate with mirror image diagonal grooves 42a, and after assembling many plates 41 the stack is completed with a blank rectangular plate. The plates 41 are compressed together and diffusion bonded, so they are sealed to each other. Corrugated Fecralloy alloy foils 44 (only one is shown) 50 μm thick coated with a ceramic coating of thickness 15 μm containing a catalyst material, of appropriate shapes and with corrugations 2 mm high, can be slid into each such groove 42, 42a and 42b. The corrugations extend parallel to the flow direction in each case.

Header chambers 46 are welded to the stack along each side, each header 46 defining three compartments by virtue of two fins 47 that are also welded to the stack. The fins 47 are one third of the way along the length of the stack from each end, and coincide with a land 43 (or a portion of the plates with no groove) in each plate 41 with diagonal grooves 42 or 42a. Gas flow headers 48 in the form of rectangular caps are then welded onto the stack at each end, communicating with the longitudinal grooves 41b. In a modification (not shown), in place of each three-compartment header 46 there might instead be three adjacent header chambers, each being a rectangular cap like the headers 48.

In use of the reactor 40 for steam/methane reforming, a steam/methane mixture is supplied to the header 48 at one end (the right hand end as shown), and the resulting mixture of hydrogen and carbon monoxide emerges through the header 48 at the other end. Methane/air mixture is supplied to the compartments of both headers 46 at the other end (the left hand end as shown), and so exhaust gas from the combustion process emerges through the compartments of both headers 46 at the right hand end as shown. The flow path for the mixture supplied to the top-left header compartment (as shown) is through the diagonal grooves 42 into the bottom-middle header compartment, and then to flow through the diagonal grooves 42a in other plates in the stack into the top-right header compartment. Hence the gas flows are at least partially counter-current, so that the hottest region in the combustion channels, which is near the inlet to those channels, is closest to the outlet for the steam/methane reforming reaction.

The headers 46 and 48 each comprise a simple rectangular cap sealed around its periphery to the outside of the stack so as to cover part of one face of the stack. They may be welded onto the outside of the stack. Alternatively, if neither of the gas flows are at elevated pressures, it may be adequate to clamp the header chambers 46, 48 onto the outside of the stack. In either case it will be appreciated that after a period of use, if the catalyst in either or both of the channels has become spent, then the headers 46 and 48 may be removed or cut off and the corresponding catalyst-carrying foils 44 removed and replaced. The headers 46, 48 can then be re-attached.

It will be understood that the type and thickness of ceramic on the corrugated foils 44 in the flow channels may be different in successive plates 41 in the stack, and that the catalyst materials may differ also. For example the ceramic might comprise alumina in one of the gas flow channels, and zirconia in the other gas flow channels. The reactor 40 formed from the plates 41 might also be suitable for performing Fischer-Tropsch synthesis. Because the plates 41 forming the stack are bonded together the gas flow channels are gas tight (apart from communication with headers 46 or 48), and the dimensions of the plates 41 and grooves 42 are such that pressures in the alternate gas flow channels may be considerably different. Furthermore the pitch or pattern of the corrugated foils 44 may vary along a reactor channel 42 to adjust catalytic activity, and hence provide for control over the temperatures or reaction rates at different points in the reactor 40. The corrugated foils 44 may also be shaped, for example with perforations, to promote mixing of the fluid within the channels 42. Furthermore parts of the foils 44 may be devoid of catalyst.

It will be appreciated that the plates forming the stack may be of a different size (typically in the range 400-1200 mm long, 150-600 mm wide), and that the diagonal grooves 42 and 42a may have a different orientation (typically between 30° and 90°), for example the plates might be 800 mm by 400 mm, and the grooves be at about 56° to the longitudinal axis (if there are three header compartments along each side) or at about 63° (if there are four header compartments). In every case the headers ensure the fluid in those sets of channels follows a serpentine path along the reactor.

In a modification to the reactor 40, the foils 44 are again of Fecralloy material, but the catalyst material is deposited directly onto the oxide layer of the Fecralloy.

Particularly where the reactor 40 is to be used for Fischer-Tropsch synthesis, the gas flow channels 42 for that reaction may decrease in width, and possibly also depth, along their length, so as to vary the fluid flow conditions, and the heat or mass transfer coefficients. During the synthesis reaction the gas volume decreases, and by appropriate tapering of the channels 42 the gas velocity may be maintained as the reaction proceeds. Furthermore the pitch or pattern of the corrugated foils 44 may vary along a reactor channel 42 to adjust catalytic activity, and hence provide for control over the temperatures or reaction rates at different points in the reactor 40.

When a reactor such as the reactor 40 is used for reactions between gases that generate gaseous products then the orientation of the channels is not of concern. However if a product may be a liquid, it may be preferable to arrange the reactor 40 so that the flow paths for this reaction slope downwardly, to ensure that any liquid that is formed will drain out of the channels 42. With the gas flowing along the corrugations in the foils 44, any liquid tends to be entrained, so minimising liquid build-up on the surface of the catalyst.

It will be appreciated that the although the heat for the steam/methane reforming reaction may be provided by catalytic combustion in adjacent channels (as described above), as an alternative the combustion may take place in an external burner (such as a laminar flow burner), the very hot exhaust gases at about 900 or 1000° C. being passed through the second gas flow channels of the reactor 14 of FIG. 1 in counter-current to the methane flow; this can enable the reacting gases in the reformer 16 to reach a final temperature of as much as 900° C. In this case it is not essential to provide the foils in the combustion channels with ceramic coating or catalyst, but such foils would nevertheless enhance heat transfer between the second gas flow channel carrying the hot exhaust gas and the reactants in the pre-reformer and reformer channels, by transferring heat to the separating plates 41. In the combustion channels of the catalytic reactor 14, if catalytic combustion is used to generate the heat (as indicated), the combustion catalyst may itself be coated with a thin porous inert ceramic layer, so as to restrict the contact of the gas mixture with the catalyst and so restrict the reaction rate particularly at the start of the channel.

Particularly where hydrogen is unavailable, it may be desirable to provide electrical heating by passing an electric current directly through the plates forming the reactor. This may be used initially to raise the temperature for example of the reforming reactor 14 to say 400° C. before supplying gases, to ensure catalytic combustion occurs. Such electrical heating may also be used during operation to adjust the reactor temperature. Electrical heating may also be used in the vicinity of the outlet from the reactor 14 to ensure that a temperature of say 900° C. is reached by the gases undergoing the reforming reaction.

As mentioned above the reactor may differ in size or shape from that shown in FIG. 2. A single such plate might instead for example be 1.0 m by 0.5 m. The stack forming a reactor might be 0.8 m thick. Several such reactors may be combined into a reaction module, for example ten such reactors might form a module provided with pipes interconnected so the gas flows are in parallel through all the reactors in the module. Such a module may be small enough to be transported in an ISO structural frame, and yet have sufficient capacity to produce synthesis gas equivalent to 1000 barrels per day of synthetic oil.

A practical plant may need to include several such modules, all being operated with gas flows in parallel, although it may not be necessary to replicate the other features (e.g. heat exchangers 18, 11, 20 etc. and separators 31 and 35) of the plant. Thus there might be say six or ten modules made up of the reactors 14, and the same number of modules of Fischer-Tropsch reactors 26. This has the benefit that if the catalysts in one module need to be replaced, that module may be disconnected and taken away for servicing, while allowing the plant to continue to operate at only slightly reduced capacity.

The invention claimed is:

1. An apparatus for processing stranded or associated gas, suitable for use on a ship, an oil rig or a floating platform, wherein the apparatus comprises one or more modules for performing steam/methane reforming or for performing Fischer-Tropsch synthesis, wherein each module comprises a plurality of reactors, and at least one module comprises a plurality of Fischer-Tropsch (FT) reactors.

2. An apparatus as claimed in claim 1, wherein at least one module comprises a plurality of reactors connected in parallel.

3. An apparatus as claimed in claim 1 wherein at least one module includes removable catalyst.

4. An apparatus as claimed in claim 3, wherein the removable catalyst is supported on a metal substrate selected from corrugated foil, dimpled foil, metal mesh, corrugated metal felt sheet and pleated metal felt sheet.

5. An apparatus as claimed in claim 1, wherein the or each module is sized to fit within the dimensions of an ISO structural frame for transportation.

6. An apparatus as claimed in claim 1, wherein each module has sufficient capacity to produce the equivalent of 1000 barrels per day of synthetic oil.

7. An apparatus for processing stranded or associated gas, suitable for use on a ship, an oil rig or a floating platform, wherein the apparatus comprises one or more modules for performing steam/methane reforming or for performing Fischer-Tropsch synthesis, wherein each module comprises a plurality of reactors, and wherein at least one reactor comprises a compact reactor comprising a plurality of metal sheets arranged to define first and second flow channels, the channels being arranged alternately to ensure good thermal contact between fluids in them.

8. An apparatus as claimed in claim 7 wherein in each compact reactor a catalyst is provided in each channel in which a reaction is to occur.

9. An apparatus for processing stranded or associated gas, suitable for use on a ship, an oil rig or a floating platform, wherein the apparatus comprises a plurality of modules for performing steam methane reforming, and a plurality of modules for performing the Fischer-Tropsch reaction, and wherein each module comprises a plurality of reactors.

10. An apparatus as claimed in claim 9, wherein the number of Fischer-Tropsch synthesis modules is between six and ten.

11. An apparatus as claimed in claim 9, wherein the plurality of modules for performing steam methane reforming are connected in parallel, and the plurality of modules for performing the Fischer-Tropsch reaction are connected in parallel.

12. An apparatus as claimed in claim 9, wherein each module comprises a compact reactor comprising a plurality of metal sheets arranged to define first and second flow channels, the channels being arranged alternately to ensure good thermal contact between fluids in them.

13. A process for processing stranded or associated gas on a ship, an oil rig or a floating platform, wherein the process involves the steps of treating the gas by steam/methane reforming to produce synthesis gas, and then subjecting the synthesis gas to Fischer-Tropsch synthesis to form liquid hydrocarbon, wherein the steam/methane reforming is carried out using a multiplicity of catalytic reforming modules connected in parallel, and the Fischer-Tropsch synthesis is carried out using a multiplicity of catalytic synthesis modules connected in parallel, the reactors containing respective catalysts, and wherein each module comprises a plurality of reactors.

14. A process as claimed in claim 13 wherein steam for the steam/methane reforming reaction is provided at least in part from the water generated during the Fischer-Tropsch synthesis process.

* * * * *

UNITED STATES PATENT AND TRADEMARK OFFICE
CERTIFICATE OF CORRECTION

| | | |
|---|---|---|
| PATENT NO. | : 8,021,633 B2 | Page 1 of 1 |
| APPLICATION NO. | : 12/081303 | |
| DATED | : September 20, 2011 | |
| INVENTOR(S) | : Michael Joseph Bowe et al. | |

It is certified that error appears in the above-identified patent and that said Letters Patent is hereby corrected as shown below:

In the Title Page:

(54): Replace "Process an Apparatus for Steam-Methane Reforming," with -- Process and Apparatus for Steam-Methane Reforming --

Signed and Sealed this
Eighth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,021,633 B2 | Page 1 of 1 |
| APPLICATION NO. | : 12/081303 | |
| DATED | : September 20, 2011 | |
| INVENTOR(S) | : Michael Joseph Bowe et al. | |

It is certified that error appears in the above-identified patent and that said Letters Patent is hereby corrected as shown below:

Title Page, Item (54) and at Column 1, lines 1 and 2, Title:

Replace "Process an Apparatus for Steam-Methane Reforming," with -- Process and Apparatus for Steam-Methane Reforming --

This certificate supersedes the Certificate of Correction issued May 8, 2012.

Signed and Sealed this
Twelfth Day of June, 2012

David J. Kappos
*Director of the United States Patent and Trademark Office*